(12) United States Patent
Dietrich

(10) Patent No.: US 12,304,264 B2
(45) Date of Patent: May 20, 2025

(54) SPRING-DAMPER SYSTEM

(71) Applicant: Bayerische Motoren Werke Aktiengesellschaft, Munich (DE)

(72) Inventor: Maximilian Dietrich, Seefeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/693,409

(22) PCT Filed: Oct. 27, 2022

(86) PCT No.: PCT/EP2022/080038
§ 371 (c)(1),
(2) Date: Mar. 19, 2024

(87) PCT Pub. No.: WO2023/094104
PCT Pub. Date: Jun. 1, 2023

(65) Prior Publication Data
US 2024/0246381 A1  Jul. 25, 2024

(30) Foreign Application Priority Data
Nov. 24, 2021  (DE) .............. 10 2021 130 734.1

(51) Int. Cl.
*B60G 15/06* (2006.01)
*B60G 15/12* (2006.01)
(Continued)

(52) U.S. Cl.
CPC .......... *B60G 15/061* (2013.01); *B60G 15/12* (2013.01); *B60G 17/019* (2013.01);
(Continued)

(58) Field of Classification Search
CPC ............. B60G 17/019; B60G 17/0272; B60G 2202/322; B60G 2400/7162; B60G 2500/22; B60G 15/12; B60G 15/061
See application file for complete search history.

(56) References Cited

U.S. PATENT DOCUMENTS 3,376,032 A * 4/1968 Schmid .................. B60G 15/12
267/225
3,480,269 A * 11/1969 Jewell ................... F16F 9/5123
280/124.157
(Continued)

FOREIGN PATENT DOCUMENTS

DE  10 2004 032 083 A1  1/2006
DE  10 2006 059 897 A1  6/2008
(Continued)

OTHER PUBLICATIONS

WO_2019161994_A1_I machine translation from FIT (Year: 2024).*
(Continued)

*Primary Examiner* — Timothy Wilhelm
*Assistant Examiner* — Maxwell L Meshaka
(74) *Attorney, Agent, or Firm* — Crowell & Moring LLP

(57) ABSTRACT

A spring-damper system for a wheel suspension of a motor vehicle comprise a support spring of a spring constant $k_T$ and a damper acting in parallel to the support spring. A spring element is arranged in series with the support spring and can be controlled by means of a controller in such a way that a total spring constant $k_G$ of the spring-damper system can be varied.

13 Claims, 2 Drawing Sheets

(51) Int. Cl.
*B60G 17/019* (2006.01)
*B60G 17/027* (2006.01)

(52) U.S. Cl.
CPC .... *B60G 17/0272* (2013.01); *B60G 2202/322* (2013.01); *B60G 2400/7162* (2013.01); *B60G 2500/22* (2013.01)

(56) References Cited

U.S. PATENT DOCUMENTS

| | | | | |
|---|---|---|---|---|
| 3,547,425 | A * | 12/1970 | Wachenheim | B64C 25/60 267/64.13 |
| 4,742,996 | A * | 5/1988 | Gold | B60G 13/18 267/64.24 |
| 5,087,068 | A * | 2/1992 | Fukanaga | B60G 17/0163 280/5.506 |
| 5,647,461 | A * | 7/1997 | Jensen | F16F 9/34 188/317 |
| 9,278,599 | B2 * | 3/2016 | Hirao | B60G 17/06 |
| 9,527,364 | B2 * | 12/2016 | Mohamed | B60G 17/019 |
| 9,809,076 | B2 * | 11/2017 | Hirao | B60G 17/018 |
| 9,829,060 | B2 * | 11/2017 | Batsch | F41H 7/02 |
| 10,752,076 | B2 * | 8/2020 | Knapczyk | F16F 9/48 |
| 10,906,370 | B1 * | 2/2021 | Hall | B60G 17/0157 |
| 11,065,931 | B1 * | 7/2021 | Keas | B60G 15/061 |
| 11,325,439 | B2 * | 5/2022 | Dietrich | F16F 1/121 |
| 11,524,544 | B2 * | 12/2022 | Dietrich | B60G 17/0523 |
| 2014/0095024 | A1 * | 4/2014 | Hirao | B60G 17/08 701/37 |
| 2016/0159188 | A1 * | 6/2016 | Mohamed | F16F 15/002 701/37 |
| 2016/0159189 | A1 * | 6/2016 | Hirao | B60G 17/06 701/37 |
| 2017/0198779 | A1 * | 7/2017 | Batsch | F16F 9/06 |
| 2019/0375263 | A1 * | 12/2019 | Knapczyk | B60G 17/08 |
| 2020/0247209 | A1 * | 8/2020 | Dietrich | B60G 17/0432 |
| 2021/0003191 | A1 * | 1/2021 | Yoon | F16F 9/34 |
| 2021/0268859 | A1 * | 9/2021 | Dietrich | F16F 9/103 |
| 2024/0084873 | A1 * | 3/2024 | Kropczynski | F16F 9/585 |
| 2024/0246381 | A1 * | 7/2024 | Dietrich | B60G 15/061 |

FOREIGN PATENT DOCUMENTS

| | | | | |
|---|---|---|---|---|
| EP | | 1593874 A1 * | 11/2005 | ......... B60G 15/061 |
| KR | | 102217080 B1 * | 2/2024 | |
| WO | WO 2019/161994 A1 | | 8/2019 | |

OTHER PUBLICATIONS

International Search Report (PCT/ISA/210) issued in PCT Application No. PCT/EP2022/080038 dated Feb. 13, 2023 with English translation (5 pages).

German-language Written Opinion (PCT/ISA/237) issued in PCT Application No. PCT/EP2022/080038 dated Feb. 13, 2023 with English translation (10 pages).

German-language Search Report issued in German Application No. 10 2021 130 734.1 dated Jul. 6, 2022 with partial English translation (10 pages).

* cited by examiner

SPRING-DAMPER SYSTEM

BACKGROUND AND SUMMARY

This disclosure relates to a spring-damper system for a wheel suspension of a motor vehicle, comprising a load-bearing spring with a spring constant $k_T$ and a damper acting parallel to the load-bearing spring.

Nowadays, ever more adaptable chassis, which can be adjusted by hand, with a tool or electrically at the push of a button, are installed in motorcycles. Various values (e.g. tension and compression stages which have an effect on the deflection and rebound behavior of the chassis, and the preloading of the spring, which has an effect on the vehicle height and therefore on the driving geometry and driving characteristics) are adjustable.

Only the spring rate of the spring is not directly adjustable since a spring is manufactured and installed with a certain spring rate. In order to change this spring rate, the spring fork or the spring strut has to be dismantled and the spring replaced.

Currently, a chassis with a dynamic electronic suspension, which adapts the chassis to the driver's manner of driving with the aid of sensor data, is installed in some motorcycles. For example, the damping changes here depending on the vehicle speed. For the adaptation, there are, for example, two operating modes. The problem is, however, that the character of the vehicle only conditionally changes between the two operating modes since there is only an influence on the damping of the chassis and not directly on the vibration characteristic, which is influenced by the spring rigidities. In order to change the spring rate, currently the spring in the chassis still has to be exchanged.

However, with an individual spring rate, a compromise always has to be entered into between comfort and sportiness since the spring rate cannot be solely configured for one of the two purposes, but instead both purposes have to be taken into account.

It is therefore the object of the present disclosure to provide a spring-damper system for a wheel suspension of a motor vehicle, in which the overall spring rate is controllable.

According to the disclosure, a spring-damper system for a wheel suspension of a motor vehicle, in particular a single-track motor vehicle, comprising a load-bearing spring with a spring constant $k_T$ and a damper acting parallel to the load-bearing spring, is disclosed. In this case, a spring element is included which acts in series with the load-bearing spring and is controllable via a control device in such a manner that an overall spring constant $k_G$ of the spring-damper system can be varied.

The basic concept of the disclosure is to extend the spring-damper system for a wheel suspension with an internally situated load-bearing spring by a controllable spring element acting in series, in order to be able to switch over between the load-bearing spring rate and the combined spring rate from the load-bearing spring and the spring element. In this way, with the actual load-bearing spring of the chassis, at least two discrete spring rates are produced. This results in better adaptation of the chassis via the possibility of selecting a spring hardness for each intended purpose, and consequently, in a better driving experience by optimized adaptation of the chassis.

In one advantageous embodiment variant, it is provided that the spring element comprises a cartridge, a piston rod for coupling to the load-bearing spring, and a spring unit.

Preferably, the spring-damper system is designed in such a manner that the piston rod extends into a cartridge interior space of the cartridge, and a main piston having a bypass for a hydraulic fluid is arranged at an end of the piston rod arranged in the cartridge interior space. Furthermore, a valve which is controllable via the control device is provided for controlling the bypass. The controllable spring element is thereby realized.

In one exemplary embodiment of the disclosure, the spring unit has a spring cartridge, the spring cartridge interior space of which is hydraulically connected directly or indirectly to the cartridge. In this way, the forces of the hydraulic fluid in the cartridge interior space also act in the spring cartridge interior space.

Furthermore, an embodiment is advantageous in which the spring unit comprises a spring with a spring constant $k_F$, a separating piston, and a separating piston stop. The separating piston divides the spring cartridge interior space into a spring chamber and a third working chamber here. The spring is arranged in the spring chamber and presses the separating piston in the spring cartridge in the direction of the separating piston stop. The separating piston stop forms a stroke stop for the separating piston here.

In a further advantageous variant, it is provided according to the disclosure that the main piston divides the cartridge interior space into a first and a second working chamber, which is in each case filled with the hydraulic fluid, and the piston rod extends through the first working chamber.

In one embodiment variant, the spring-damper system according to the disclosure is formed in that the spring unit is integrated in the cartridge in such a manner that the third working chamber and the second working chamber merge directly into each other and form a common working chamber. In this way, a particularly space-saving variant which can be integrated in a conventional wheel suspension is realized.

In an alternative embodiment of the present spring-damper system, it is provided that the third working chamber and the second working chamber are connected to each other via a hydraulic line. An external compensating or spring container is thereby realized which is suitable for use in a shock absorber for the rear wheel guide, or in addition to a shock absorber with damping, in which the actual spring is located directly around the damper.

In a preferred embodiment of the disclosure, the cartridge comprises a displaceable base as a piston rod guide, which is mounted movably in the cartridge. A mechanical stop is provided on the cartridge for the displaceable base. Furthermore, the displaceable base together with the main piston forms the first working chamber.

In a further advantageous variant, it is provided according to the disclosure that the spring is a spiral spring and/or a gas compression spring filled with nitrogen Furthermore, an embodiment is advantageous in which the controllable valve is controllable electrically, mechanically, hydraulically or pneumatically.

In an advantageous embodiment variant, it is provided that an input means for controlling the spring element is connected to the control device. As a result, a driver of the motor vehicle can send a command for controlling the spring-damper system to the control device. The switching over or changing of the spring rate can advantageously take place here "on the fly" at the touch of a button.

In one exemplary embodiment, the spring-damper system according to the disclosure is formed in that a temperature sensor for determining the temperature of the hydraulic fluid is provided. Furthermore, data for controlling the valve depending on the hydraulic fluid temperature are stored in the control device. The temperature sensor is arranged here, for example, in the cartridge or in the displaceable base of the cartridge.

In an alternative embodiment, the valve comprises a coil with an internal resistor, and further data for controlling the valve depending on the hydraulic fluid temperature are stored in the control device. The valve is arranged here in the cartridge interior space. The further data comprise here, for example, a temperature model for the internal resistor of the coil, on the basis of which the hydraulic fluid temperature can be determined. The valve is always conceived of being the control valve which permits the switching over between the spring rates, i.e. the separation of the second working chamber above the piston from the first working chamber. The solenoid of the valve can be located inside or outside the cartridge, but the valve itself has to be positioned in or very close to the main piston. However, the solenoid has to be arranged inside the cartridge if it is intended to contribute to estimating the temperature since otherwise too many temperature resistors, including the oil of the cartridge, falsify the result.

Accordingly, the spring-damper system comprises a spring cartridge having a bypass valve which can be opened or closed electrically, mechanically, hydraulically or pneumatically in order to achieve a variable spring rate. This gives rise to three operating possibilities. The first operating possibility is the state in which the bypass is open. If the damper piston moves up and down here in the housing, the hydraulic oil can flow through the piston and only the piston rod volume is transmitted via the separating piston into the compensating volume. The additional spring is moved here with a predetermined step-up transmission ratio in relation to the piston rod stroke. The step-up transmission is provided by the hydraulic surfaces between the separating piston and piston rod. This means that the force of the additional spring has only a small effect on the piston rod. This state corresponds to a comfort mode and/or a mode for low loading states.

In the second operating possibility, the bypass is closed. If the bypass is closed, the main piston can no longer move freely up and down in the housing. During the compression of the chassis, the volume of the hydraulic fluid above the piston is completely displaced into the spring cartridge interior space. The low compressibility of the oil means that the force of the spring element acts on the piston rod. The spring force of the spring acts if the main piston diameter is equal to the separating piston diameter, therefore in the ratio of 1:1 to the piston rod. Similarly, a step-up or step-down transmission ratio can also be produced here, depending on the hydraulic surfaces of the main piston to the separating piston. In addition, the hydraulic fluid volume can no longer be compensated for below the hydraulic fluid when the bypass is closed. Use is therefore made of a displaceable base which moves upward with the piston so as not to generate any negative pressure. This state corresponds to a sports mode and/or to a mode for high loading states.

The third operating possibility is the state between the first and the second state. By only partial opening or closing of the bypass, an intermediate state can be achieved in which a spring rate between the states 1 and 2 is achieved. By, e.g., slight opening, a small part of the hydraulic fluid can flow through the piston and the spring rate is therefore reduced somewhat from the maximum spring rate which can be produced. However, the thus freely selectable intermediate spring rate can be ensured only to a limited extent since it depends on the density and viscosity of the hydraulic fluid when passing through the valve aperture.

The resulting overall spring rate of the damper in state 1, 2 or 3 is in each case the spring rate of the load-bearing spring added to the respectively acting portion of the additional spring. The chassis can therefore be optimally configured to a soft spring rate in the comfort mode and, when required, a harder spring can be "switched on" in order to achieve an optimum driving sensation in the sports mode.

The above-disclosed features can be combined as desired.

BRIEF DESCRIPTION OF THE DRAWINGS

The figures are schematic by way of example. The same reference numbers in the figures indicate identical functional and/or structural features.

DETAILED DESCRIPTION OF THE DRAWINGS

Figure 1:
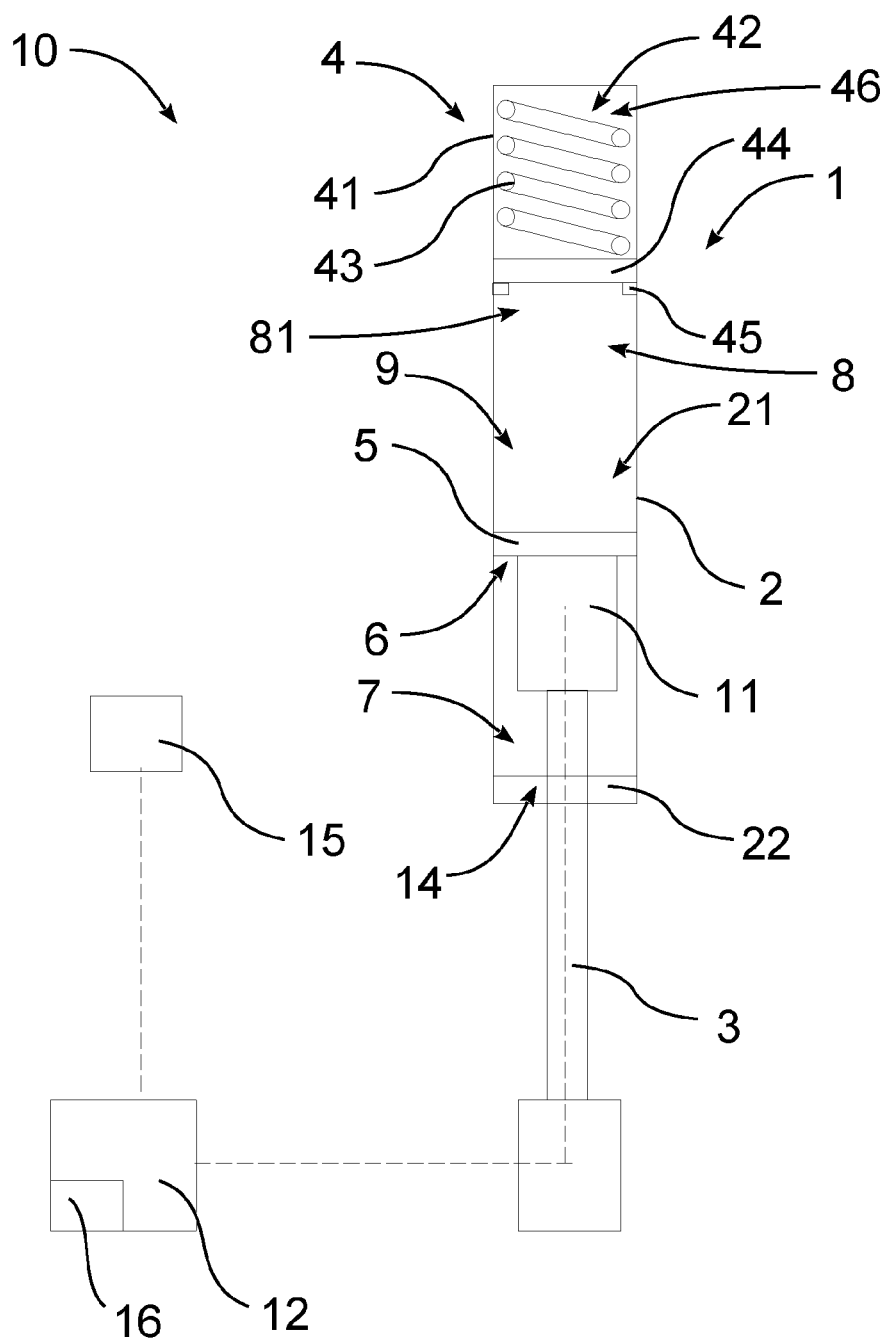
FIG. 1 shows a spring-damper system for a wheel suspension of a motor vehicle.

FIG. 1 illustrates a spring-damper system 10 for a wheel suspension of a motor vehicle, comprising a load-bearing spring 20 (not shown) with a spring constant $k_T$ and a damper 30 (not shown) acting parallel to the load-bearing spring 20. A spring element 1 is included here which acts in series with the load-bearing spring 20 and is controllable via a control device 12 in such a manner that an overall spring constant $k_G$ of the spring-damper system 10 can be varied. The control device 12 may comprise known hardware and/or software components, including a controller, processor, CPU, or microprocessor configured to execute software and/or firmware stored in a memory, such as RAM or ROM.

The spring element 1 comprises a cartridge 2, a piston rod 3 for coupling to the load-bearing spring 20, and a spring unit 4. The piston rod 3 extends into a cartridge interior space 21 of the cartridge 2, and a main piston 5 having a bypass 6 for a hydraulic fluid 9 is arranged at an end of the piston rod 3 arranged in the cartridge interior space 21. In addition, a valve 11 which is controllable via the control device 12 is provided for controlling the bypass 6. The controllable valve 11 is controllable electrically, mechanically, hydraulically or pneumatically.

Furthermore, the spring unit 4 has a spring cartridge 41, the spring cartridge interior space 42 of which is hydraulically connected directly to the cartridge 2, a spring 43 with a spring constant $k_F$, a separating piston 44, and a separating piston stop 45. The separating piston 44 divides the spring cartridge interior space 42 into a spring chamber 46 and a third working chamber 81 here. Furthermore, the spring 43 is arranged in the spring chamber 46 and presses the separating piston 44 in the spring cartridge 41 in the direction of the separating piston stop 45. The spring 43 is a spiral spring and/or a gas compression spring filled with nitrogen.

Furthermore, the main piston 5 divides the cartridge interior space 21 into a first and a second working chamber 7, 8, which is in each case filled with the hydraulic fluid 9, and the piston rod 3 extends through the first working chamber 7. The spring unit 4 is integrated in the cartridge 2 in such a manner that the third working chamber 81 and the second working chamber 8 merge directly into each other and form a common working chamber.

In addition, the cartridge 2 comprises a displaceable base 22 which is mounted movably in the cartridge 2. The displaceable base 22 together with the main piston 5 forms the first working chamber 7. In addition, an input means 15 is provided which is connected for controlling the spring element 1 via the control device 12. The input means may comprise electronic and/or mechanical input means, such as a touch screen, button, switch, dial or knob.

In addition, a temperature sensor 14 for determining the hydraulic fluid temperature is provided, and data 16 for controlling the valve 11 depending on the hydraulic fluid temperature are stored in the control device 12. The data 16 may be stored in a memory, such as the associated with the control device 12.

Figure 2:
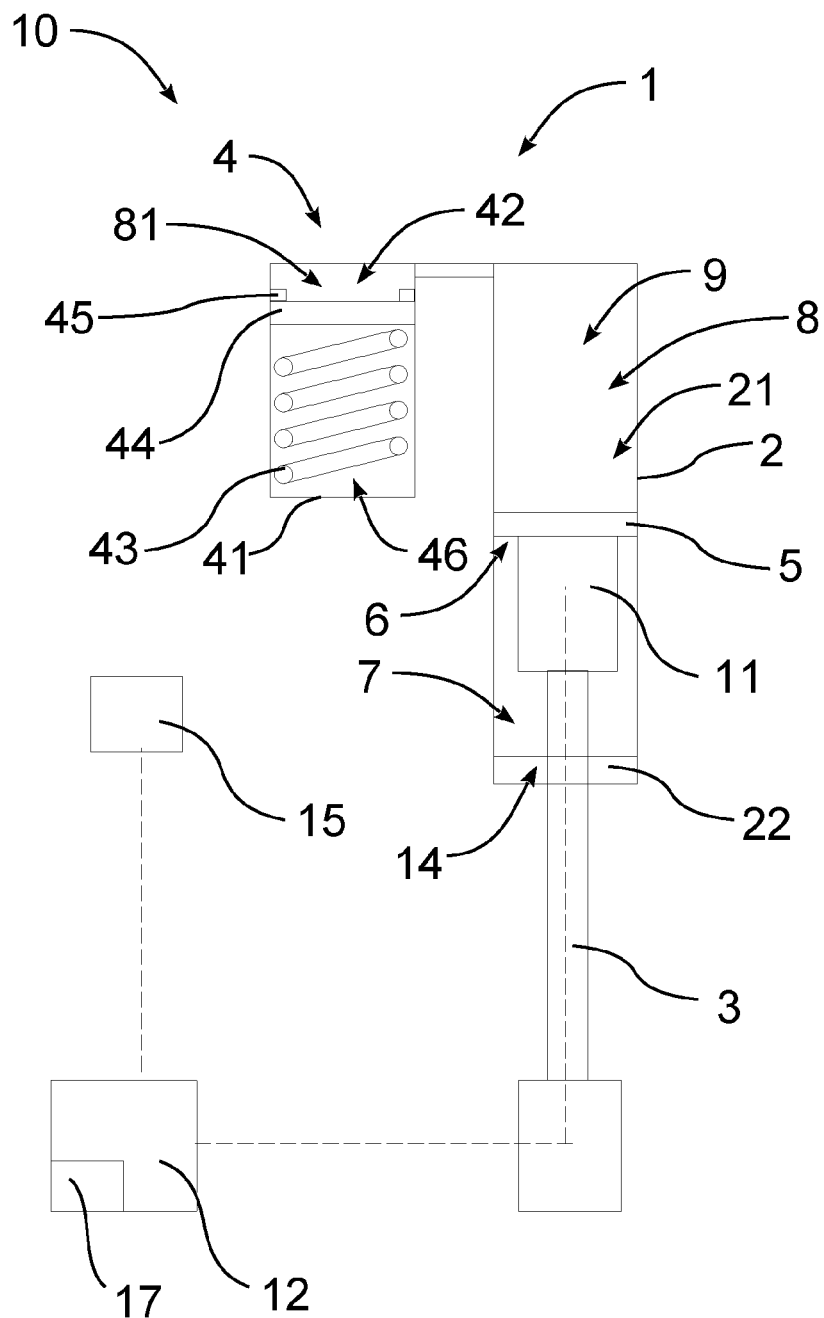
FIG. 2 shows an alternative spring-damper system for a wheel suspension of a motor vehicle.

FIG. 2 shows an alternative spring-damper system 10 for a wheel suspension of a motor vehicle. Since the features of this spring-damper system 10 substantially correspond to the features of the embodiment illustrated in FIG. 1, only different features will be discussed below.

The spring-damper system 10 comprises a spring unit 4 with a spring cartridge 41, the spring cartridge interior space 42 of which is hydraulically connected indirectly to the cartridge 2. The third working chamber 81 and the second working chamber 8 of the spring-damper system 10 are connected to each other here via a hydraulic line 13. Furthermore, the valve 11 comprises a coil with an internal resistor, and further data 17 for controlling the valve 11 depending on the hydraulic fluid temperature are stored in the control device 12. The data 17 may be stored in a memory, such as the associated with the control device 12.

The disclosure is not limited in terms of its design to the preferred exemplary embodiments described above. Rather, numerous variants are conceivable which make use of the presented solution even in fundamentally different embodiments.

What is claimed is:

1. A spring-damper system for a wheel suspension of a motor vehicle, comprising:
   a load-bearing spring with a spring constant and a damper acting parallel to the load-bearing spring, and
   a spring element which acts in series with the load-bearing spring, the spring element being controllable by a control device in such a manner that an overall spring constant of the spring-damper system can be varied,
   wherein the spring element comprises:
      a spring unit,
      a cartridge having a cartridge interior space,
      a piston rod for coupling to the load-bearing spring, the piston rod extending into the cartridge interior space, and
      a main piston arranged in the cartridge interior space at an end of the piston rod, the main piston having a bypass for a hydraulic fluid to pass through the main piston, and a valve positioned on the main piston having an adjustable valve aperture controllable by the control device for controlling the flow of the hydraulic fluid through the bypass.

2. The spring-damper system according to claim 1, wherein the spring unit has a spring cartridge, the spring cartridge interior space of which is hydraulically connected directly or indirectly to the cartridge.

3. The spring-damper system according to claim 2, wherein the spring unit comprises a spring with a spring constant, a separating piston, and a separating piston stop, wherein the separating piston divides the spring cartridge interior space into a spring chamber and a third working chamber, wherein the spring is arranged in the spring chamber and presses the separating piston in the spring cartridge in the direction of the separating piston stop.

4. The spring-damper system according to claim 3, wherein the third working chamber and the second working chamber are connected to each other by means of a hydraulic line.

5. The spring-damper system according to claim 3, wherein the spring is a spiral spring and/or a gas compression spring filled with nitrogen.

6. The spring-damper system according to claim 1, wherein the main piston divides the cartridge interior space into a first and a second working chamber, which is in each case filled with the hydraulic fluid, and the piston rod extends through the first working chamber.

7. The spring-damper system according to claim 6, wherein the spring unit is integrated in the cartridge in such a manner that the third working chamber and the second working chamber merge directly into each other and form a common working chamber.

8. The spring-damper system according to claim 1, wherein the cartridge comprises a displaceable base which is mounted movably in the cartridge.

9. The spring-damper system according to claim 8, wherein the displaceable base together with the main piston forms the first working chamber.

10. The spring-damper system according to claim 1, wherein the valve is controllable electrically, mechanically, hydraulically or pneumatically.

11. The spring-damper system according to claim 1, wherein an input means for controlling the spring element is operatively connected to the control device.

12. The spring-damper system according to claim 1, wherein a temperature sensor for determining a hydraulic fluid temperature is provided, and
wherein data for controlling the valve depending on the hydraulic fluid temperature are stored in the control device.

13. The spring-damper system according to claim 1, wherein the valve comprises a coil with an internal resistor, and further data for controlling the valve depending on the hydraulic fluid temperature are stored in the control device.

* * * * *